United States Patent [19]
Auzel et al.

[11] Patent Number: 5,858,891
[45] Date of Patent: Jan. 12, 1999

[54] GLASS-CERAMIC MATERIALS ESPECIALLY FOR LASERS AND OPTICAL AMPLIFIERS, DOPED WITH RARE EARTHS

[75] Inventors: François Auzel, Le Mesnil-St-Denis; Pétrus Santa Cruz, Massy, both of France

[73] Assignee: France Telecom, France

[21] Appl. No.: 618,009

[22] Filed: Mar. 18, 1996

Related U.S. Application Data

[63] Continuation of Ser. No. 356,103, Dec. 15, 1994, abandoned.

[30] Foreign Application Priority Data

Dec. 16, 1993 [FR] France .................................. 93 15163

[51] Int. Cl.$^6$ ................................ C03C 3/32; C03C 4/10
[52] U.S. Cl. ................................ 501/3; 501/40; 501/904; 501/37
[58] Field of Search .................................. 501/3, 37, 40, 501/904

[56] References Cited

U.S. PATENT DOCUMENTS

| | | | |
|---|---|---|---|
| 4,752,593 | 6/1988 | Tick | 501/40 |
| 5,108,477 | 4/1992 | Cornelius et al. | 501/40 |
| 5,379,149 | 1/1995 | Snitzer et al. | 501/40 X |
| 5,420,080 | 5/1995 | Wang et al. | 501/3 |

FOREIGN PATENT DOCUMENTS

| | | | |
|---|---|---|---|
| A-0 294 977 | 5/1988 | European Pat. Off. | C03C 4/12 |
| A-0 420 240 | 9/1990 | European Pat. Off. | C03C 4/00 |
| A-2 238 679 | 7/1973 | France | C03C 10/00 |

OTHER PUBLICATIONS

Physics and Chemistry of Glasses, col. 28, No. 1 Feb. 1987, pp. 4–10.

*Primary Examiner*—Karl Group
*Attorney, Agent, or Firm*—Blakely Sokoloff Taylor & Zafman

[57] ABSTRACT

A glass-ceramic material that is doped with rare-earths and is especially suitable for lasers and optical amplifiers is disclosed. The glass-ceramic material is optically non-scattering, and the doping with rare earths is essentially in the microcrystalline phase. The glass-ceramic material is preferably made up from complexes of metals having a valency of three or greater and of halides of rare earth ions having a valency of three or greater. The rare-earth ions include an optically active rare-earth ion.

10 Claims, 1 Drawing Sheet

GLASS-CERAMIC MATERIALS ESPECIALLY FOR LASERS AND OPTICAL AMPLIFIERS, DOPED WITH RARE EARTHS

This is a continuation of application Ser. No. 08/356,103 filed Dec. 15, 1994 now abandoned.

BACKGROUND OF THE INVENTION

1. Field of the Invention

The present invention relates to new glass-ceramic materials especially for lasers or optical amplifiers, which macroscopically exhibit the advantage of glasses, namely: ease of preparation and of shaping and relatively low cost, and which microscopically exhibit the advantage of crystals, namely: high effective sections and good quantum efficiencies.

The present invention also relates to a process for the manufacture of such glass-ceramic materials.

2. Description of the Prior Art

There are already known glass-ceramic materials based on beryllium fluorides doped with rare earths, employed for their display property, as described by Auzel in Patent FR-2 077 731. On a microscopic scale these materials behave like microcrystals. However, these materials are toxic and scatter light. This scattering, which is useful in display, makes these materials unsuitable for being used in optical amplification.

Other glass-ceramic materials for laser application have been described by Rapp and Chrysochoos in J. Mat. Sci. 7 1090 (1972). They are oxide-based materials which exhibit the disadvantage that the rare-earth doping is not essentially in the crystalline phase. Overall, these glass-ceramic materials have laser properties which are inferior to those of the initial glasses (before heat treatment).

In the case of oxide-based glass-ceramic materials similar results have also been reported by Muller and Neuroth in J. Appl. Phys. 44 2315 (1973); there again the laser properties were inferior to those of the initial glasses (before heat treatment) because the rare earths were not mainly in the crystalline phase.

Mixed glass-ceramic materials based on oxide and fluorides have been described by Auzel, Morin and Pécile in Patent FR-7327 486 of 26.7.73 for use in display; they exhibit the advantage that the rare earths are only in the fluorine-containing microcrystalline phases, and this gives them a good emission efficiency. However, these materials are unsuitable for laser use because the size of the microcrystals of the order of a few micrometers makes them optically scattering.

Furthermore, glass-ceramic materials based solely on fluorides but not doped with optically active rare earths have been described, where their mechanical-properties are concerned, by Poulain and Grosdemouge in the journal Verres et Réfractaires, 26 852 (1982). However, the microcrystalline phases of these glass-ceramics are of the $Na_7Zr_6F_{31}$ type, that is to say are not constituted starting with the rare earth ($LaF_3$).

SUMMARY OF THE INVENTION

A glass-ceramic material, especially suitable for use in lasers and optical amplifiers, is disclosed. The glass-ceramic material includes a glassy matrix that consists essentially of a plurality of halides of metals having a valency of three or greater. The glass-ceramic material also includes a phase of microcrystallites that essentially contain a plurality of halides of metals having a valency of three or greater and rare earth ions having a valency of three or greater. The rare earth ions having a valency of three or greater include optically active rare-earth ions selected from a group consisting of $Er^{3+}$, $Pr^{3+}$, $Nd^{3+}$, $Ho^{3+}$, $Tm^{3+}$ and $Yb^{3+}$. The glass-ceramic material is optically non-scattering outside the absorption bands of the optically active rare earth ions at wavelengths between 0.3 microns and 7 microns.

DESCRIPTION OF THE PREFERRED EMBODIMENT

Figure 1:
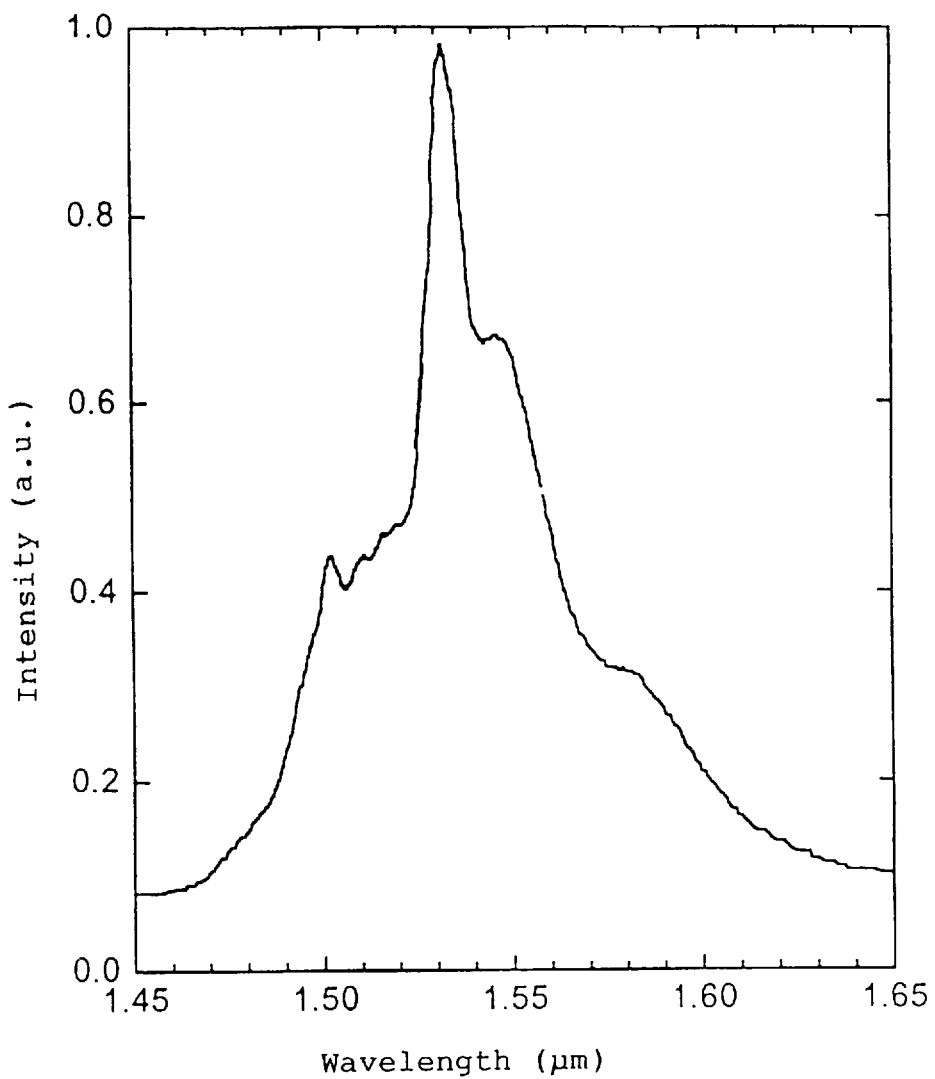
FIG. 1 illustrates an intensity spectrum for wavelengths varying from 1.45 microns to 1.65 microns.

The new glass-ceramic materials doped with rare earths according to the invention are characterized in that they are optically nonscattering and that the doping with rare earths is essentially in the microcrystalline phase.

The expression "optically nonscattering" should be understood to mean that these materials are transparent outside the absorption bands of the rare-earth dopant at wavelengths commonly employed in laser applications, that is to say in the case of wavelengths generally between 0.3 micrometers and 7 micrometers.

The concept of glass-ceramic materials usable in laser applications and optical amplifiers is well known and a person skilled in the art will be able to refer, inter alia, to the abovementioned publications in the analysis of the prior art.

These glass-ceramic materials are formed by an annealing process which makes it possible to create a microcrystalline phase embedded in a glassy matrix.

The glass-ceramic materials according to the invention have larger effective sections (preferably from 3 to 5 times larger) than the known glassy materials, smaller nonhomogeneous widths and higher quantum efficiencies.

The microcrystals of the glass-ceramic materials according to the invention are preferably between 30 and 7000 Å in size, in order to exhibit the required optical transparency which is that most appropriate for laser and optical amplification applications.

The glassy matrix is advantageously present in the ceramic material in a proportion by volume of between 10 and 99%, preferably 20 to 80%.

To obtain a laser gain, the microcrystallites are doped with rare-earth ions at least a proportion of which is made up of optically active rare-earth ions.

These optically active rare-earth ions are advantageously present in the microcrystallites in a molar proportion of between 0.01 and 100% relative to the total rare-earth ions.

The expression "molar" is intended to refer to the number of atoms of optically active rare earth and of optically inactive rare earth.

According to a preferred alternative form, the glass-ceramic materials according to the invention are made up of a glassy matrix consisting of complexes of at least trivalent metals of which the glass consists and of a phase base of microcrystallites which consists of complexes of at least trivalent metals of which the glass consists, associated with at least trivalent rare-earth ions at least a proportion of which is made up of optically active rare-earth ions.

The materials according to the invention are remarkable in that they are essentially free from divalent or monovalent metals. As well as the microcrystalline phase, the glassy matrix is therefore also free from divalent or monovalent metals.

The glassy matrix preferably consists of halides, especially fluorides, of trivalent and/or tetravalent metals; these trivalent and/or tetravalent metals are advantageously chosen from the group consisting of zirconium, indium, aluminium and gallium.

According to the invention the crystallization nuclei contain the rare earth as a constituent and not, merely, in trace form among the other cations which the microcrystals contain. This essential property ensures that the rare earth does retain a crystalline environment although the matrix may be macroscopically glassy. The number of optically active rare-earth ions is sufficient in this environment to provide a laser gain.

Among the optically active rare-earth cations which are at least trivalent there will be advantageously mentioned those included in the group consisting of $Er^{3+}$, $Pr^{3+}$, $Nd^{3+}$, $Ho^{3+}$, $Tm^{3+}$ and $Yb^{3+}$, by themselves or mixed.

The optically inactive cations are chosen especially from $La^{3+}$, and $Ln^{3+}$. The anions are advantageously chosen from halogens, especially fluorine.

The percentage of active rare-earth ions will depend on the amplification length that is employed. In the case of fibres the percentage will be low, whereas in the case of an integrated optical system the percentage will be high. The molar ratio of the rare earths to the metals in the crystals will vary especially between 0.3 and 1.

The complexes of trivalent and/or tetravalent metals of which the microcrystallites consist are preferably chosen from halides, especially fluorides. These metals are preferably identical with those of which the glassy matrix consists, that is to say that they are chosen from zirconium, gallium, indium and aluminium.

The present invention also relates to a process for the manufacture of the glass-ceramic materials described above, characterized in that a mixture of glass-forming agents is formed, consisting of complexes of at least trivalent metals and of halides of at least trivalent rare earths and in that, after melting, the mixture is annealed at the nucleation temperature of a crystalline compound which has the rare earth as a constituent.

The melting of the mixture is performed in an atmosphere which is inert towards the latter, that is to say free from any trace of water and of oxygen. The molten mixture is cast and annealed also in an inert atmosphere. The casting and the annealing are performed in a suitable crucible, especially of vitreous carbon, heated to a temperature which is appropriate to the composition of the mixture. The annealing is continued at constant temperature for a period which is sufficient as a function of the desired size and number of the microcrystals, but which is limited so that the glass-ceramic material does not become opaque (scattering) and consequently unusable for optical amplification.

In the case of a starting mixture obtained from commercial compounds such as zirconium tetrafluoride, aluminium trifluoride and rare-earth fluorides such as lanthanum or erbium trifluorides, the annealing temperature will be advantageously between 400° and 470° C. and the annealing time will not exceed 1 h 30 min in order to conform to the recipes required for the transparency.

By way of guidance, a starting mixture is obtained from the following compounds: $ZrF_4$, $LaF_3$, $ErF_3$ and $AlF_3$ in the following molar proportions: $ZrF_4/LaF_3$=3 to 6; $AlF_3$ 2.5 to 10%; $ErF_3/(ErF_3+LaF_3)$=0.01 to 100%.

These materials find an application in particular in optical telecommunications for the production of semiconductor diode-pumped compact laser sources and in amplifiers incorporating guided optics and more particularly amplifiers and lasers produced with waveguides doped with rare earths.

It has been noted that, with the aid of the glass-ceramic materials according to the invention, the spectra obtained were identical with those obtained from polycrystalline powders based on the same compounds synthesized directly, which shows that the glass-ceramic materials of the invention have macroscopic spectral properties which are characteristic of the microcrystals which they contain.

Furthermore, the widths of the spectra obtained with the aid of these glass-ceramic materials are reduced and this results in effective sections being obtained which are from 3.5 to 5 times higher than in the known glassy materials.

Another subject of the invention is the planar guide amplifiers comprising such glass-ceramic materials. These materials according to the invention can reduce the active wavelength dimensions to a cm since the effective sections therein can be increased by a factor of 5.

Another subject of the invention is the optical fibres made with the aid of these glass-ceramic materials, these optical fibres enabling the lengths of the fibre amplifiers to be reduced from a few meters to a few centimeters.

The invention is now illustrated by the following example, given by way of guidance.

The starting point is the mixture of the following commercial compounds:

$ZrF_4$ (73.6%)—$LaF_3$ (18.4%)—$ErF_3$ (3%)—$AlF_3$ (5%). This mixture is heated until it melts at 770° C. and then, after homogenizing, is cast in a vitreous graphite mould heated to 450° C.; annealing is continued in this mould for 20 min. After natural cooling in an inert atmosphere, microanalytical inspection using a transmission microscope shows microcrystals a few hundred A in diameter, to which it has been possible to assign the following main compositions:

$REZr_3F_{15}$ and $REZrF_7$ (RE=La+Er).

The active ion reaches a proportion of 15% (Er/La+Er) in these crystallites, in which the rare earths (RE) are constituents. The proportion of $Er^{3+}$ is an optimum for the laser emissions and the amplification at 1.54 $\mu$m. The intensity spectrum (a.u.) obtained is shown in the single FIGURE enclosed herewith, for wavelengths varying from 1.45 $\mu$m to 1.65 $\mu$m. This FIGURE shows the emission spectrum of $Er^{3+}$ at 1.54 $\mu$m.

We claim:

1. A glass-ceramic material consisting essentially of:
   a) a glassy matrix, said glassy matrix consisting essentially of a plurality of halides of metals having a valency of three or greater;
   b) a phase of microcrystallites, said microcrystallites consisting essentially of a plurality of halides of metals having a valency of three or greater and rare-earth ions, having a valency of three or greater, said rare-earth ions having a valency of three or greater including an optically active rare-earth ion selected from the group consisting of $Er^{3+}$, $Pr^{3+}$, $Nd^{3+}$, $Ho^{3+}$, $Tm^{3+}$ and $Yb^{3+}$; and wherein said glass-ceramic material is optically nonstattering outside the absorption bands of the optically active rare-earth ions at wavelengths between 0.3 $\mu$m and 7 $\mu$m.

2. The glass-ceramic material of claim 1, wherein the microcrystallites are between 30 and 7000 angstroms in size.

3. The glass-ceramic material of claim 2, wherein the glassy matrix is present in the glass-ceramic material in a proportion by volume of between 10 and 99%.

4. The glass-ceramic material of claim 3, wherein the optically active rare-earth ions are present in the microcrystallites in a molar proportion of between 0.01 and 100%, relative to the total amount of the rare-earth ions.

5. The glass-ceramic material of claim 1, wherein the halides of metals having a valency greater than three of the glassy matrix are fluorides.

6. The glass-ceramic material of claim 5, wherein the metals having a valency of three or greater are selected from the group consisting of zirconium, indium, aluminum and gallium.

7. The glass-ceramic material of claim 1 wherein the halides of the metals having a valency of three or greater of the microcrystallites are fluorides.

8. The glass-ceramic material of claim 7 wherein the metals having a valency of three or greater are selected from the group consisting of zirconium, indium, aluminum and gallium.

9. The glass-ceramic materials of claim 1, wherein the molar ratio of the rare earth ions to the metals having a valency of three or greater in the microcrystallites varies between approximately 0.3 and 1.

10. The class ceramic material of claim 1, wherein the rare earth ions include an optically inactive rare-earth ion selected from the group consisting of $La^{3+}$ and $Ln^{3+}$.

* * * * *

UNITED STATES PATENT AND TRADEMARK OFFICE
CERTIFICATE OF CORRECTION

PATENT NO. : 5,858,891
DATED : January 12, 1999
INVENTOR(S) : Auzel et al.

It is certified that error appears in the above-identified patent and that said Letters Patent is hereby corrected as shown below:

In column 1, line 53, delete "their mechanical-properties" and insert -- their mechanical properties -- .

In column 4, line 34, delete "a few hundred A in diameter" and insert -- a few hundred Å in diameter -- .

In column 4, line 59, delete "material is optically nonstattering" and insert -- material is optically nonscattering -- .

In column 5, line 6, delete "having a valency greater than three" and insert -- having a valency of three or greater -- .

Signed and Sealed this

Tenth Day of October, 2000

*Attest:*

Q. TODD DICKINSON

*Attesting Officer*       *Director of Patents and Trademarks*